United States Patent [19]

Khojasteh

[11] Patent Number: 5,699,417
[45] Date of Patent: Dec. 16, 1997

[54] TEXT TRANSMISSION USING DTMF SIGNALLING

[75] Inventor: Kamran Khojasteh, Morgan Hill, Calif.

[73] Assignee: Cidco Incorporated, Morgan Hill, Calif.

[21] Appl. No.: 426,298

[22] Filed: Apr. 21, 1995

[51] Int. Cl.[6] .................................................. H04M 1/57
[52] U.S. Cl. .................................... 379/142; 379/97
[58] Field of Search ............................ 379/52, 142, 283, 379/93, 96, 97; 370/94.1

[56] References Cited

U.S. PATENT DOCUMENTS

| | | | |
|---|---|---|---|
| Re. 31,789 | 1/1985 | Hashimoto | 379/142 |
| 4,268,721 | 5/1981 | Nielson et al. | 379/52 |
| 4,304,968 | 12/1981 | Klausner et al. | 379/142 |
| 4,528,424 | 7/1985 | Middleton et al. | 379/184 |
| 4,582,956 | 4/1986 | Doughty | 379/142 |
| 4,608,457 | 8/1986 | Fowler et al. | 379/52 |
| 5,103,449 | 4/1992 | Jolissaint | 379/127 |
| 5,206,900 | 4/1993 | Callele | 379/142 |
| 5,228,080 | 7/1993 | Nutter et al. | 379/373 |
| 5,249,220 | 9/1993 | Mosowitz et al. | 379/93 |
| 5,263,084 | 11/1993 | Chaput et al. | 379/215 |
| 5,327,493 | 7/1994 | Richmond et al. | 379/372 |
| 5,371,781 | 12/1994 | Ardon | 379/59 |
| 5,384,770 | 1/1995 | Mays et al. | 370/94.1 |
| 5,490,204 | 2/1996 | Gulledge | 379/59 |

FOREIGN PATENT DOCUMENTS

96/33570 A3  10/1996  WIPO.

*Primary Examiner*—Krista M. Zele
*Assistant Examiner*—Daniel S. Hunter
*Attorney, Agent, or Firm*—Skjerven, Morrill, MacPherson, Franklin & Friel LLP; Lawrence E. Lycke; Serge J. Hodgson

[57] ABSTRACT

A method and system for transmitting text information using multifrequency signals is provided. A switching center transmits a first multifrequency signal indicating the start of a text transmission. A receiver unit receives the first multifrequency signal and prepares to receive text information. The switching center transmits to the receiver unit a second and third multifrequency signals after the first multifrequency signal. The second and third multifrequency signals contain information corresponding to a text character. The receiver unit receives the second and third multifrequency signals and determines the text character transmitted. The switching center transmits a fourth multifrequency signal to the receiver unit indicating the end of the text transmission.

27 Claims, 11 Drawing Sheets

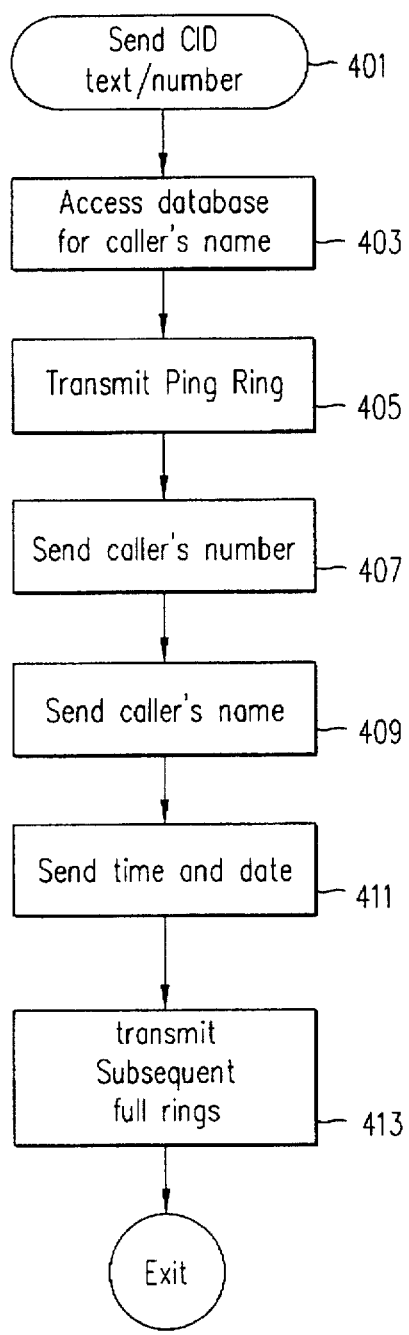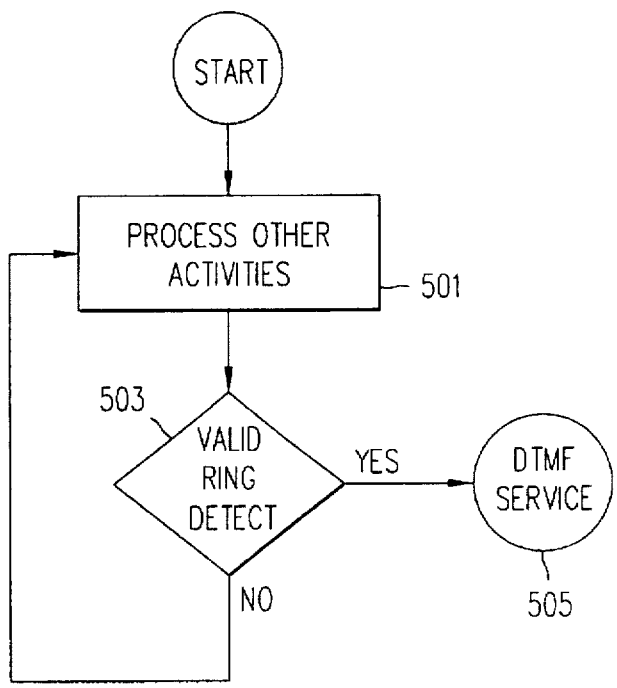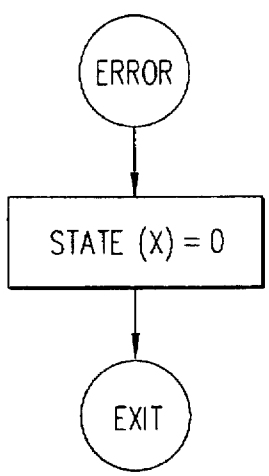
FIG. 4
FIG. 5
FIG. 15

TEXT TRANSMISSION USING DTMF SIGNALLING

FIELD OF THE INVENTION

This invention is related to data transmission and particularly to text transmission using DTMF signalling.

BACKGROUND INFORMATION

Some telephone systems support a service sometimes referred to as caller identification, or caller ID ("CID"). The CID service provides the CID subscriber (i.e., the called party) information about the caller which is then displayed by the subscriber's customer premise equipment ("CPE"), typically a telephone set. The caller information typically includes the caller's telephone number. Some systems also support text transmissions so the caller's name and the time and date may be transmitted. The text transmission feature has been found to be very desirable with subscribers.

The systems that support text transmissions generally use a frequency shift keying ("FSK") signalling system to transmit the CID information. However, some telephone systems do not support FSK transmissions. In these telephone systems, the CID information is transmitted via the same dual tone multifrequency ("DTMF") signalling system used by most conventional telephone systems to "dial" telephone numbers. However, these conventional DTMF CID telephone systems do not support text transmission because conventional DTMF signalling provides only the numeric characters (i.e., "0" through "9") and four "additional" characters (i.e., "A" through "D"). Consequently, these conventional DTMF CID telephone systems simply transmit the caller's telephone number.

SUMMARY

In accordance with the present invention, a method and system for transmitting text information using multifrequency signals is provided. In one embodiment, a switching center transmits a first multifrequency signal indicating the start of a text transmission. A receiver unit receives the first multifrequency signal and prepares to receive text information. The switching center transmits to the receiver unit second and third multifrequency signals following the first multifrequency signal. The second and third multifrequency signals contain information corresponding to a text character. The receiver unit receives the second and third multifrequency signals and determines the text character transmitted. The switching center transmits a fourth multifrequency signal to the receiver unit indicating the end of the text transmission.

In a preferred embodiment for use in a non-FSK telephone system supporting CID, a central office transmits DTMF signals corresponding to numbers plus coded text characters over a telephone line. A CPE receives the DTMF signals, decodes the numbers plus coded text characters, and displays the CID information (both numbers and text) to the CID subscriber. In this manner, this system provides transmission of alphanumeric CID information to the CID subscriber, which is not supported by conventional non-FSK telephone systems.

BRIEF DESCRIPTION OF THE DRAWINGS

FIG. 4 shows a flow diagram of CID information transmission by the Central Office in the example illustrated in FIG. 3.

FIGS. 5–15 show a flow diagram of the operation of the CPE in the example illustrated in FIG. 3.

DETAILED DESCRIPTION

Figure 1:
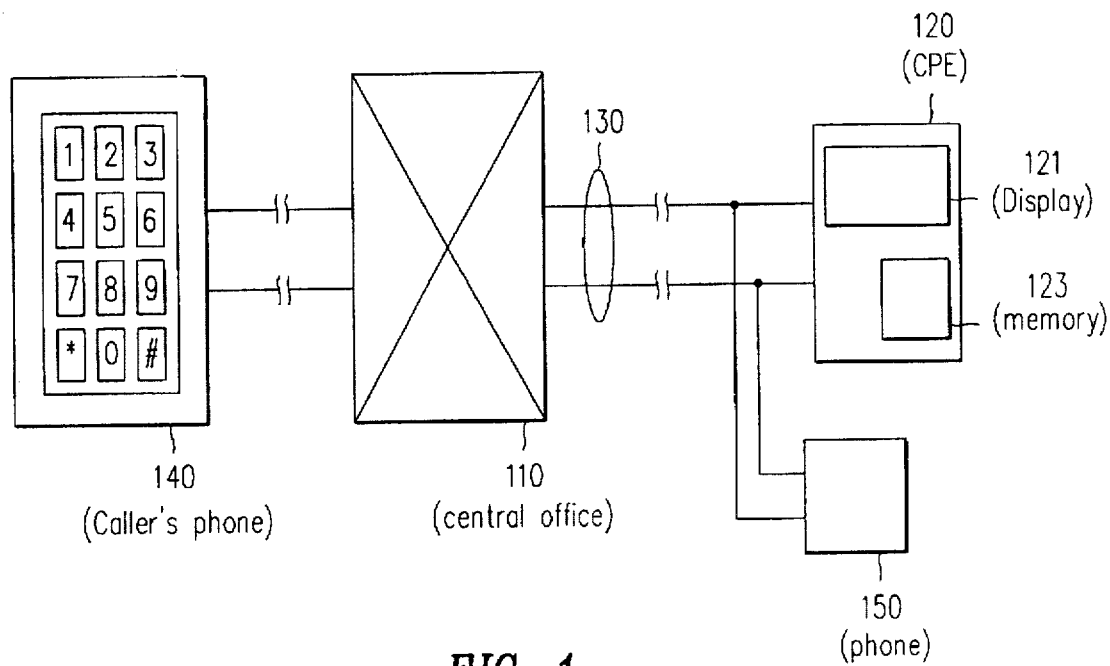
FIG. 1 shows a block diagram of a system according to one embodiment of the present invention.

FIG. 1 shows a block diagram of a system 100 according to one embodiment of the present invention. System 100 includes a switching unit 110, a receiving unit 120 and a transmission channel 130 coupling switching unit 110 and receiving unit 120. Switching unit 110 includes a signal generator and a ring generator. Receiving unit 120 includes a display 121 and a memory 123.

In this embodiment, system 100 is a CID telephone system used to transmit a caller's alphanumeric CID information from a caller's calling unit 140 to a CID subscriber using DTMF signalling. The CID information typically provided is the date and the caller's name and telephone number, but of course, the CID information may include other alphanumeric information.

Because this embodiment of system 100 is a CID telephone system, switching unit 110 is a central office and includes a DTMF signal generator, receiving unit 120 is a CPE, transmission channel 130 is a telephone line, and calling unit 140 is the caller's telephone. The DTMF signal generator may be a commercial DTMF tone generator device, such as model UM91531 available from UMC, the data sheet of which is herein incorporated by reference. A conventional telephone 150 may be coupled in parallel with receiving unit 120 as a separate unit, or combined into a single unit with CPE 120.

Although in this embodiment transmission channel 130 is a telephone line, other embodiments of transmission channel 130 include alternative channels which include transmission channels such as optical cables or digital loop carrier systems. Further, the present invention may be used in applications other than telephone systems, such as paging systems, intercom systems, modems and home automation equipment.

In operation, a caller using calling unit 140 calls the subscriber. Switching unit 110 connects calling unit 140 to calling unit 150 (and, thus, receiver unit 120) via transmission channel 130 and transmits a multifrequency signal indicating the start of a text data transmission. In this embodiment, the first multifrequency signal is a DTMF "A" signal, transmitted after the caller's telephone number has been transmitted between the first and second ring signals.

However, in other embodiments, the order in which the telephone number and text data is transmitted may be reversed. Further, in other embodiments, the caller's telephone number and the text data may be transmitted after a telephone line voltage polarity reversal and before the first ring.

Referring back to FIG. 1, receiver unit 120 detects the first multifrequency signal (i.e., DTMF "A") and prepares to receive an incoming text data transmission. Switching unit 110 also receives second and third multifrequency signals after the first multifrequency signal and before the second ring signal. Each of the second and third multifrequency signals is a DTMF signal for a decimal digit. The decimal digits represented by the second and third multifrequency signals form, in most cases, the two-digit ASCII code for a text character. Table 1 below lists the codes (a slightly modified ASCII code) for the text characters (and signals indicating time and date) supported in this embodiment. Of course, a coding system other than ASCII may be used in other embodiments. Further, the coding scheme used may support transmission of different text characters. Still further, three or more decimal digits may be used to expand the number of text characters supported.

| Decimal | Meaning | Decimal | Meaning |
| --- | --- | --- | --- |
| 00 | Time | 66 | B |
| 01 | Date | 67 | C |
| 02 to 31 | Reserved | 68 | D |
| 32 | Space | 69 | E |
| 33 | ! | 70 | F |
| 34 | " | 71 | G |
| 35 | # | 72 | H |
| 36 | $ | 73 | I |
| 37 | % | 74 | J |
| 38 | & | 75 | K |
| 39 | ' | 76 | L |
| 40 | ( | 77 | M |
| 41 | ) | 78 | N |
| 42 | * | 79 | O |
| 43 | + | 80 | P |
| 44 | , | 81 | Q |
| 45 | - | 82 | R |
| 46 | . | 83 | S |
| 47 | / | 84 | T |
| 48 | 0 | 85 | U |
| 49 | 1 | 86 | V |
| 50 | 2 | 87 | W |
| 51 | 3 | 88 | X |
| 52 | 4 | 89 | Y |
| 53 | 5 | 90 | Z |
| 54 | 6 | 91 | [ |
| 55 | 7 | 92 | \ |
| 56 | 8 | 93 | ] |
| 57 | 9 | 94 | ^ |
| 58 | : | 95 | _ |
| 59 | ; | 96 | ` |
| 60 | < | 97 | { |
| 61 | = | 98 | Reserved |
| 62 | > | 99 | Reserved |
| 63 | ? | | |
| 64 | @ | | |
| 65 | A | | |

Subsequent text characters may be transmitted using additional pairs of appropriate DTMF signals. Switching unit 110 indicates the end of the text data transmission by transmitting a fourth multifrequency signal. In this embodiment, the fourth multifrequency signal is the DTMF "C" symbol. The text data transmission is completed before switching center 110 transmits the next ring signal (or the first ring signal in a line reversal telephone system).

Receiving unit 120 detects the fourth multifrequency signal and can then display the text information on display 121 and/or store the transmitted text information in memory 123 for later retrieval. Display 121 can be a LCD display, such as model DMC16433 available from OPTREX, the data sheet of which is herein incorporated by reference. For example, when the string of DTMF signals

A676576766982327368C is transmitted by switching unit 110, receiving unit 120 displays and/or stores the text message "CALLER ID" on display 121.

The CID service of system 100 also provides the time and date of the call along with the caller's name and telephone number. Thus, Table 1 also lists codes 00 and 01, used to indicate the start of a time and date transmission, respectively. Switching unit 110 transmits the decimal digits of the time (or date) following the code for time data (or date data). For example, switching unit 110 would transmit the string of DTMF signals

A001435010301C if the caller made the call at 2:35 pm on March 1. Thus, system 100 supports text data transmission using DTMF signalling, which is not supported by conventional non-FSK telephone systems.

Figure 2:
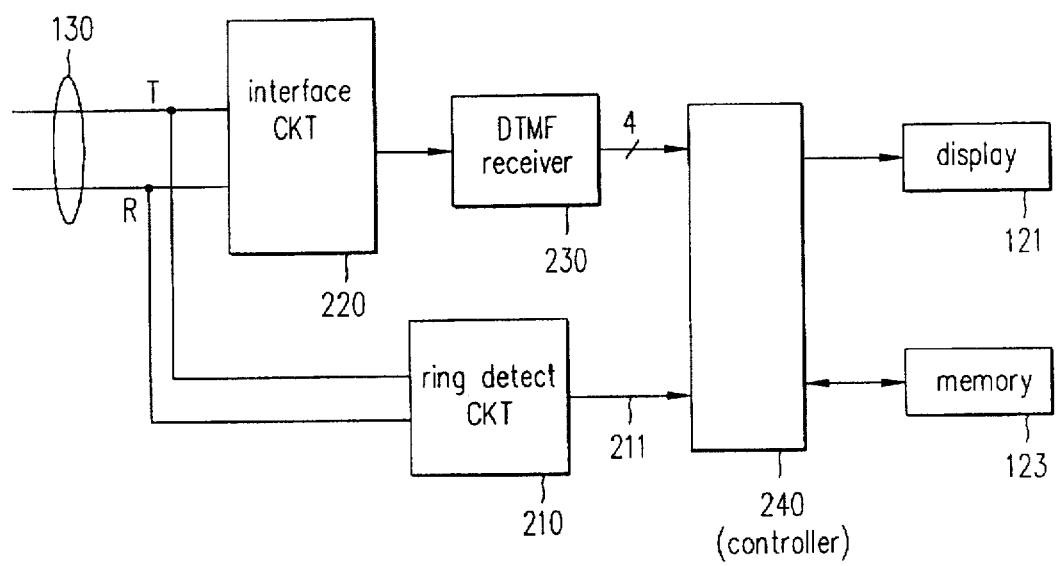
FIG. 2 shows a block diagram of one embodiment of the CPE depicted in the system of FIG. 1.

FIG. 2 shows a block diagram of receiver unit 120. Receiver unit 120 includes a ring detect circuit 210 coupled to the tip and ring lines of the telephone line included in transmission channel 130, an interface circuit 220 also coupled to transmission channel 130, a DTMF receiver 230 coupled to the interface circuit 220, and a controller 240 coupled to both ring detect circuit 210 and DTMF receiver 230. Controller 240 may be any suitable controller, such as, for example, model MC68HC05 available from Motorola, the data sheet of which is herein incorporated by reference. Display 121 and memory 123 are also coupled to controller 240.

Ring detect circuit 210 is similar to the ring detect circuits used in many conventional CID systems. Ring detect circuit 210 is coupled to the tip and ring lines of the telephone line and detects the ring signal transmitted by switching unit 110 (FIG. 1), which in this embodiment is a central office. Ring detect circuit 210 then transmits a signal to controller 240 via line 211 which indicates that a ring signal has been detected. As a result, controller 240 knows that the central office has transmitted the first ring signal and prepares to receive CID information.

For telephone systems that use a telephone line voltage reversal scheme to indicate the start of a CID information transmission, ring detect circuit 210 would be replaced with a polarity detector (not shown). In these systems, the central office reverses the polarity of the telephone line voltage, which is detected by the polarity detector. The polarity detector then transmits a signal to controller 240 to signal controller 240 that the central office will be transmitting CID information.

Interface circuit 220 is a conventional telephone line interface and serves as a transmission channel interface. Interface circuit 220 helps isolate receiver unit 120 from the telephone line. For example, interface circuit 220 may be an opto-isolator circuit similar to those used in conventional CID subscriber devices.

DTMF receiver 230 is a conventional DTMF receiver device, such as model TC35301BP available from Toshiba, the data sheet of which is herein incorporated by reference. DTMF receiver 230 is coupled to the telephone line through interface circuit 220 and detects whether the central office has transmitted any DTMF signals. DTMF receiver 230 outputs a 4-bit digital signal to Controller 240 that indicates which DTMF signal was received. Controller 240 then causes display 121 to display the CID information and/or stores the CID information in memory 123.

Figure 3:
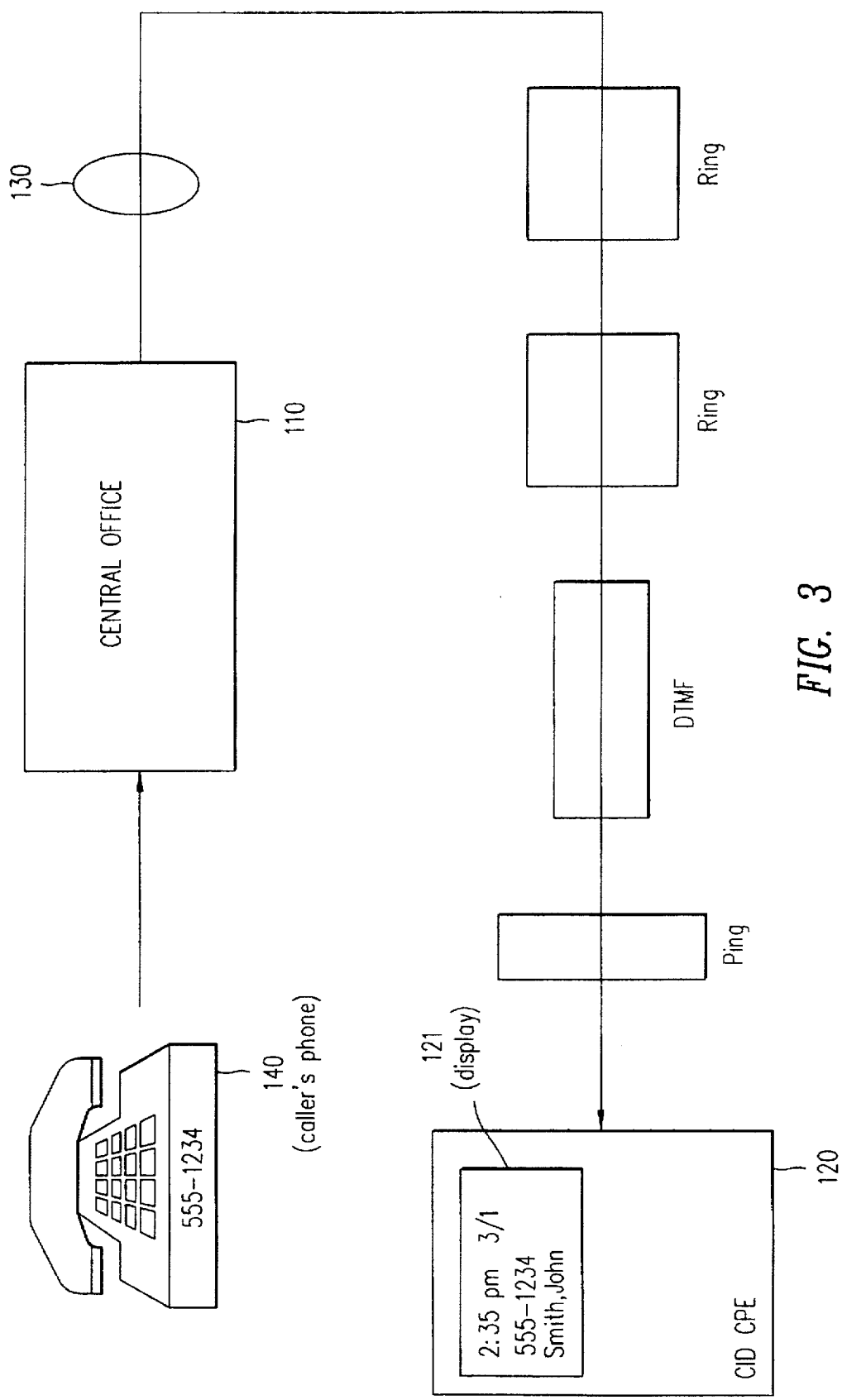
FIG. 3 illustrates an example of data transmission in the system depicted in FIG. 1.

FIG. 3 illustrates an example of how CID information (with text data) is transmitted in system 100. In this example, at 2:35 pm on March 1, caller John Smith, with the telephone number 555-1234, dials a called party using the caller's calling unit 140 (in this embodiment, a conventional telephone). The switching unit 110 (in this embodiment, a central office) detects when the caller goes off-hook to dial the calling party's telephone number and accesses a data base containing additional CID information related to the caller's telephone number. The central office also controls the switched voice pathways in the conventional manner to couple the calling unit to transmission channel 130 (i.e., a telephone line in this example) corresponding to the telephone number. Further, the central office has a ring generator and DTMF signal generator.

The central office causes the ring generator to transmit a "ping" ring to the telephone line to indicate the start of a DTMF CID transmission, as in a conventional CID telephone system. The "ping" ring is a ring signal having a very short duration and is the first ring signal the central office transmits to indicate a call in typical telephone systems. The central office then transmits the CID information retrieved from the data base using the ASCII coded text characters as described above. The central office then transmits normal ring signals to alert the called party of the incoming call.

The receiving unit 120 (in this embodiment, a CPE) detects the ping ring and prepares to receive CID information from the central office. The CPE then detects the DTMF signals transmitted by the central office and decodes the DTMF signals into the CID information (such as the telephone number, the time of the call, and the caller's name). The CPE displays the CID information and can optionally store the CID information in a memory for later retrieval.

FIG. 4 shows a flow diagram of CID information transmission by the central office in the example illustrated in FIG. 3. In a step 401 the central office receives the telephone number "dialed" by the caller via the caller's telephone. The central office determines the caller's telephone number when the caller goes off-hook to dial the calling party's telephone number.

In a next step 403, the central office accesses a database which is preprogrammed to contain the predetermined CID information which is to be transmitted to the subscriber in addition to the caller's telephone number. Typically, this additional CID information is the name associated with the caller's telephone number.

In a next step 405, the central office controls the voice pathways to couple the caller's telephone to the telephone line associated with the telephone number "dialed" by the caller. In addition, the central office transmits the ping ring to the telephone line.

In steps 407–411, the central office transmits the CID information to the telephone line. In step 407, the central office transmits the caller's telephone number, preceded by a DTMF "D" signal. In step 409, the central office transmits the name associated with caller's telephone number, preceded by a DTMF "A" signal. In step 411, the central office transmits the time and date, followed by a DTMF "C" signal to indicate the end of the CID information transmission.

In a next step 413, the central office then transmits subsequent normal ring signals to the telephone line as in a conventional CID telephone system.

FIGS. 5–12 show a flow diagram of the operation of the receiving unit 120 (FIG. 2) in the example illustrated in FIG. 3. FIG. 5 shows the operational loop of receiving unit 120. In a step 501, receiving unit 120 performs normal on-going activities. These on-going activities are not relevant to the present invention and, thus, are not described.

In a next step 503, receiver unit 120 checks to see if ring detect circuit 210 (FIG. 2) has detected a valid ring signal. If no such valid ring signal is detected, the process returns to step 501. However, if a valid ring signal is detected, receiver unit 120 performs a step 505. Step 505 is a DTMF Service operation described below in conjunction with FIG. 6.

Figure 6:
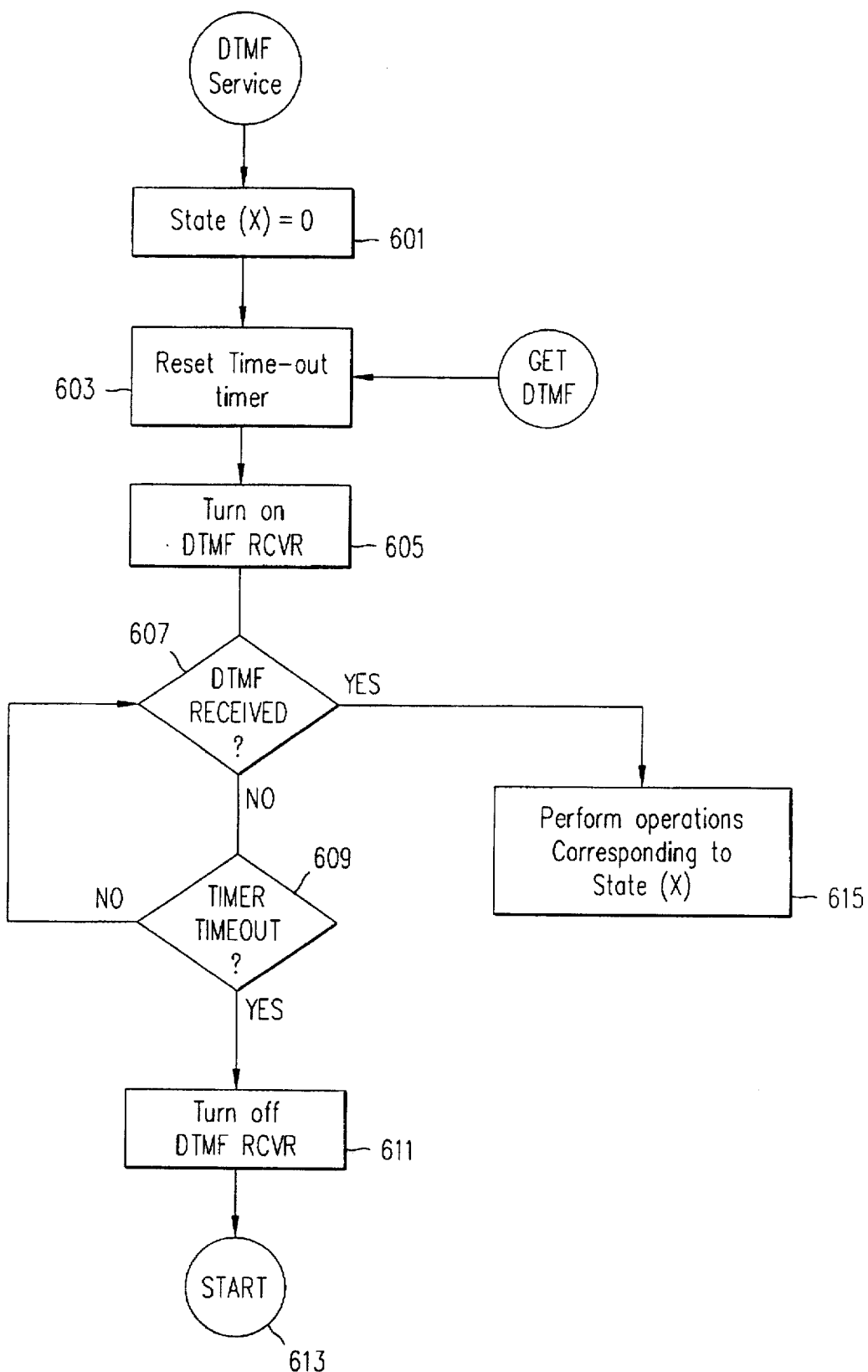

FIG. 6 illustrates the flow of the DTMF Service operation. The DTMF Service operation is in the form of a state machine. In a step 601, the state variable is initialized to "0". Then in a next step 603, a timeout timer is reset.

In a next step 605, receiver unit 120 activates DTMF receiver 230 (FIG. 2) to receive the CID information to be transmitted by the central office.

In a next step 607, DTMF receiver 230 detects whether a DTMF signal is being received by the receiver unit 120. If no DTMF signal is being received, in a step 609 the timeout timer is checked and if not expired, receiver unit 120 returns to step 607. However, if the timer is expired, then receiver unit 120 performs a next step 611, where DTMF receiver 230 is deactivated. Receiver unit 120 then performs a next step 613 to return to step 501 and begin normal on-going activities.

Referring back to step 607, if a DTMF signal is being received, then receiver unit 120, in a next step 615, performs the operation corresponding to the state indicated by the state variable, as described below in conjunction with FIGS. 7–14.

Figure 7:
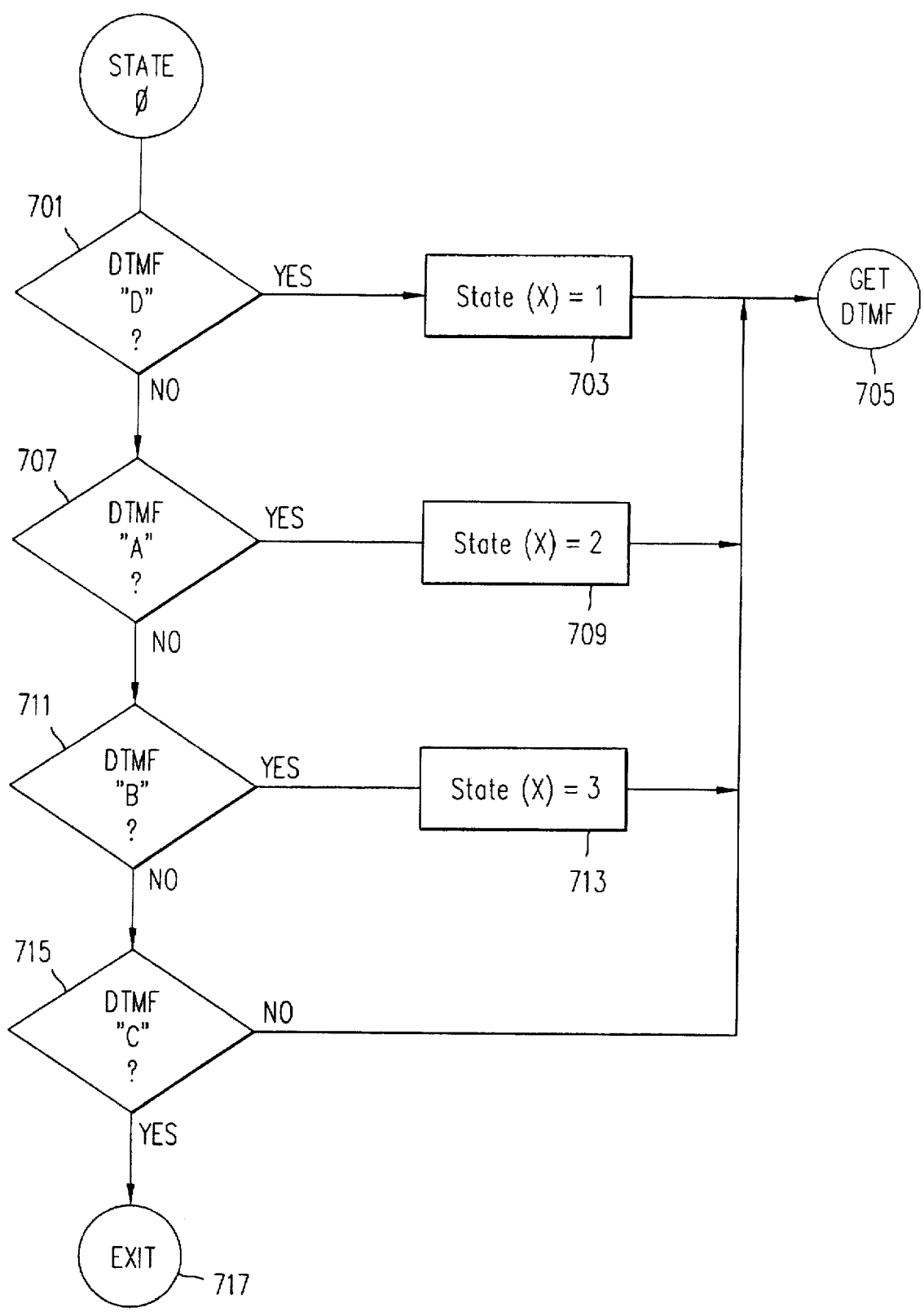

FIG. 7 shows the flow of operation of receiver unit 120 when in state "0". The steps of state "0" determine whether a telephone number transmission or a text data transmission is detected.

In a step 701, receiver unit determines whether DTMF receiver 230 has detected a DTMF "D" signal. The DTMF "D" signal indicates the start of the transmission of the caller's telephone number. If a DTMF "D" signal has been detected, then in a step 703 receiver unit 120 changes the state variable to 1. In a next step 705, receiver unit 120 returns to step 603 (FIG. 6) so that receiver unit 120 can receive a next DTMF signal.

If a DTMF "D" signal is not detected in step 701, then receiver unit 120 performs a step 707. In step 707, receiver unit 120 determines whether DTMF receiver 230 has detected a DTMF "A" signal. The DTMF "A" signal indicates the start of the transmission of text data. If a DTMF "A" signal has been detected, then in a step 709 receiver unit 120 changes the state variable to 2. Then receiver unit 120 performs step 705, so that receiver unit 120 returns to step 603 and can receive a next DTMF signal.

If a DTMF "A" signal is not detected in step 707, then receiver unit 120 can optionally perform a step 711 (otherwise, receiver unit 120 proceeds to a step 715). In step 711, receiver unit 120 determines whether DTMF receiver 230 has detected a DTMF "B" signal. The DTMF "B" signal indicates the start of a feature which is supported in some telephone systems. This feature is not relevant to the present invention and will not be described.

If a DTMF "B" signal has been detected, then in a step 713 receiver unit 120 changes the state variable to 3. Then receiver unit 120 performs step 705, so that receiver unit 120 returns to step 603 and can receive a next DTMF signal.

If a DTMF "B" is not detected in step 711, then receiver unit 120 performs step 715. In step 715, receiver unit 120 determines whether DTMF receiver 230 has detected a DTMF "C" signal. The DTMF "C" signal indicates the end of the transmission of CID information.

If in step 715 a DTMF "C" signal has been detected, then receiver unit 120 performs a step 717. In step 717, receiver unit 120 performs an Exit operation to return to step 609 (FIG. 6) so that receiver unit 120 can turn off the DTMF receiver and return to step 501 (FIG. 5).

If in step 715 a DTMF "C" signal is not detected, receiver unit 120 performs step 705, so that receiver unit 120 returns to step 603 and can receive a next DTMF signal.

Figure 8:
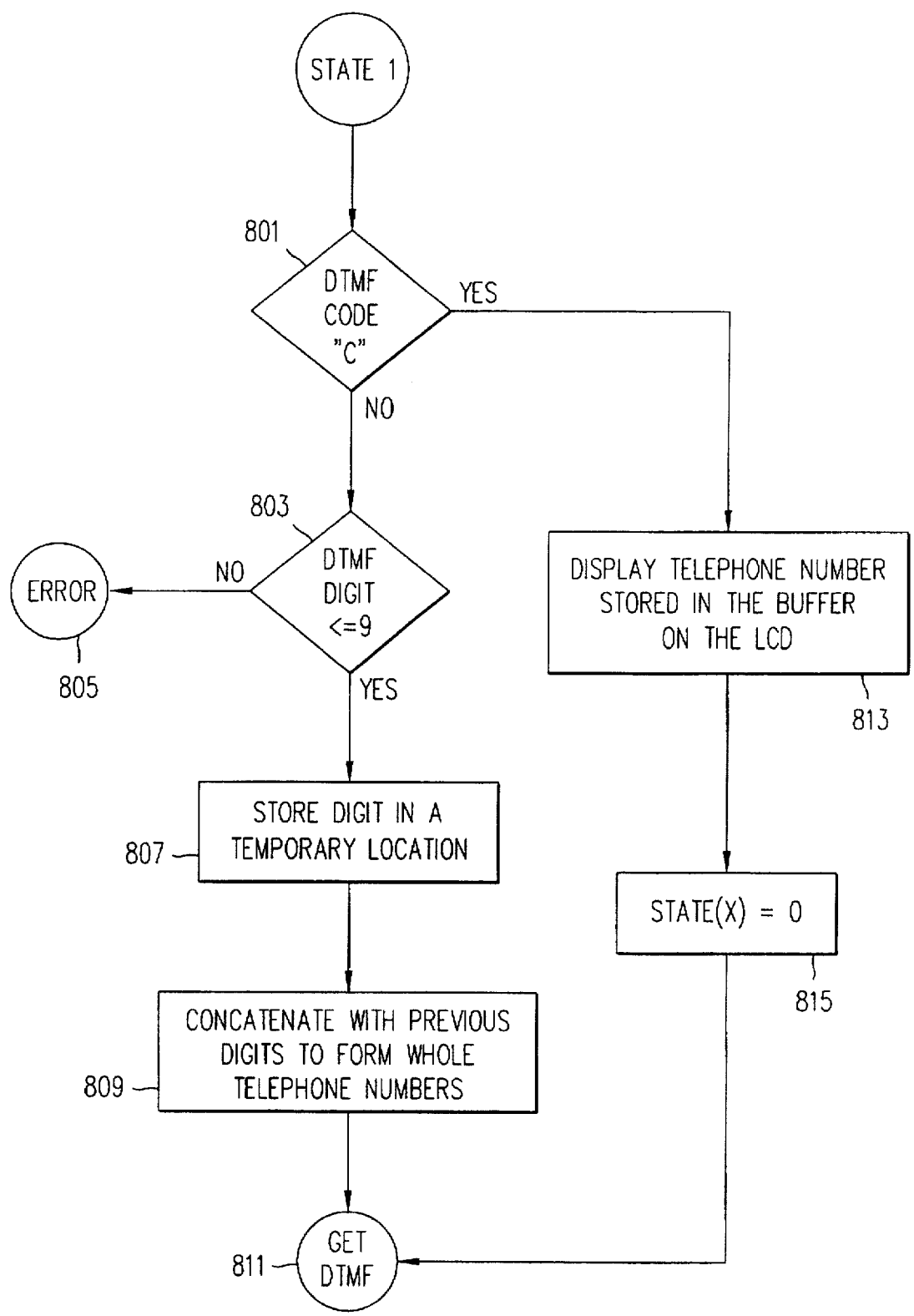

FIG. 8 shows the flow of operation of receiver unit 120 when in state "1". Receiver unit 120 enters state "1" after detecting a DTMF "D" signal in step 701 (FIG. 7). The steps of state "1" process the caller's telephone number transmitted by the central office.

In a step 801, receiver unit 120 determines whether DTMF receiver 230 received a DTMF "C" signal. If a DTMF "C" signal was not received, then a step 803 is performed. In step 803, receiver unit 120 determines whether the received DTMF signal is a DTMF "0" through "9" (i.e., a decimal digit). If the received DTMF signal is not a decimal digit, then receiver unit 120 performs a step 805, which is an error routine. The error routine is described further in conjunction with FIG. 15 below. However, if the DTMF signal is a decimal digit, then receiver unit 120 performs a step 807 where the decimal digit is stored in a buffer.

In a next step 809, receiver unit 120 concatenates the decimal digit stored in the buffer with previously received decimal digits (if any). In a next step 811, receiver unit 120 performs a "GET DTMF" operation to return to step 603 (FIG. 6) and receive a next DTMF signal.

However, if in step 801 DTMF receiver 240 has detected a DTMF "C" signal, then receiver unit 120 performs a step 813. Because the DTMF "C" signal indicates the end of a data transmission, receiver unit 120 has received the caller's entire telephone number. Thus, in step 813, receiver unit 120 displays the concatenated decimal digits, which is the caller's telephone number. In other embodiments, the received telephone number is also stored in a memory for later retrieval. Receiver unit 120 then performs steps 815 and 811 to reset the state variable to state 0 and return to step 603 (FIG. 6) to receive a next DTMF signal, respectively.

Figure 9:
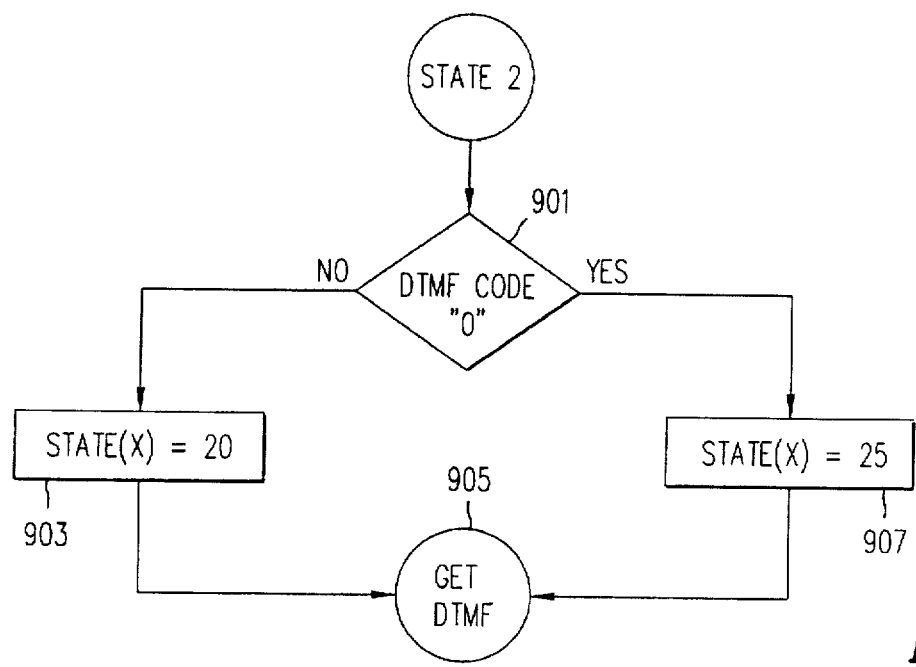

FIG. 9 shows the flow of operation of receiver Unit 120 when in state "2". Receiver unit 120 enters state "2" after detecting the start of a text data transmission (i.e., after detecting a DTMF "A" signal). The steps of state "2" determine whether the central office is transmitting text characters or time/date information.

In a step 901, receiver unit 120 determines whether a DTMF "0" signal was received. If a DTMF "0" signal was received, receiver unit 120 sets the state variable to "25". In a next step 905, receiver unit 120 returns to step 603 (FIG. 6) to receive a next DTMF signal.

However, if in step 901 receiver unit 120 does not receive a DTMF "0" signal, then receiver unit 120 sets the state variable to "20". Then receiver unit 120 performs step 905 to return to step 603 (FIG. 6) to receive a next DTMF signal.

Figure 10:
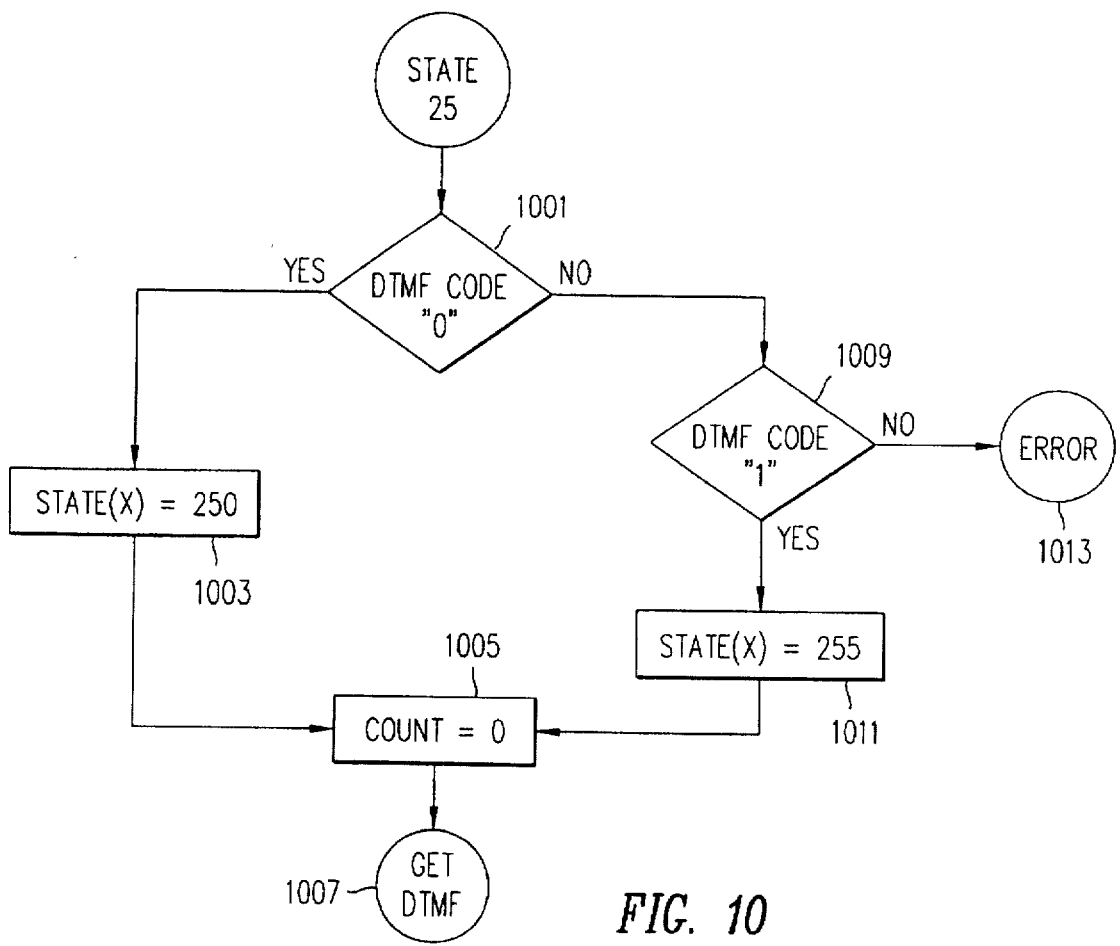

FIG. 10 shows the flow of operation of receiver unit 120 when in state "25". Receiver unit 120 enters state "25" after detecting a DTMF "0" signal in step 901 (FIG. 9) described above. The steps of state "25" determine whether the central office is transmitting time or date information. As defined in Table 1, a "00" corresponds to time information, and a "01" indicates date information.

In a step 1001, receiver unit 120 determines whether a DTMF "0" signal was received. If receiver unit 120 received a DTMF "0" signal, then the central office has indicated that the time of the call will be transmitted next. In a next step 1003, receiver unit 120 sets the state variable to "250" to process the forthcoming time data transmission. In a next step 1005, receiver unit 120 resets a counter. Receiver unit 120 then returns to step 603 (FIG. 6) to receive a next DTMF signal in a next step 1007.

However, if in step 1001 receiver unit 120 has not received a DTMF "0" signal, in a step 1009 receiver unit 120 determines whether a DTMF "1" signal was received. If a DTMF "1" signal was received, in a step 1011 receiver unit 120 then sets the state variable to "255" to process the forthcoming date data transmission. Then receiver unit 120 performs steps 1005 and 1007 to reset the counter and return to step 603 (FIG. 6) to receive a next DTMF signal. However, if in step 1009 receiver unit 120 did not receive a DTMF "1" signal, then an error occurred and, in a step 1013, receiver unit 120 performs the error routine (described below in conjunction with FIG. 15).

Figure 11:
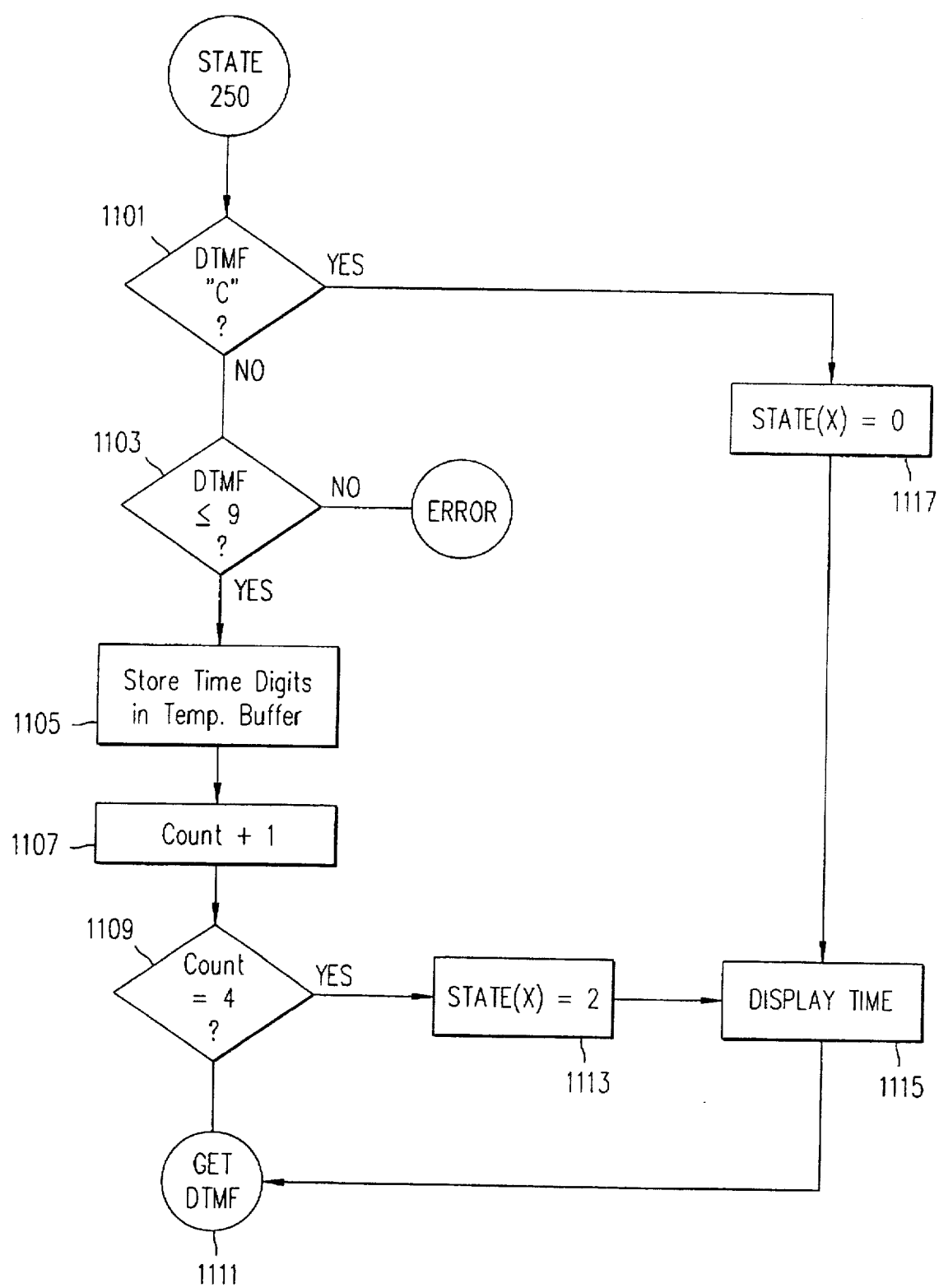

FIG. 11 shows the flow of operation of receiver unit 120 when in state "250". Receiver unit 120 enters state "250" after detecting a DTMF "0" signal in step 1003 (FIG. 10) described above. The steps of state "250" process the time data transmission from the central office.

In a step 1101, receiver unit 120 determines whether a DTMF "C" signal was received. If receiver unit 120 did not receive a DTMF "C" signal (i.e., the "end of transmission" signal), then receiver unit 120 performs a next step 1103. In step 1103, receiver unit 120 determines whether the received DTMF signal does not correspond to a decimal digit. In this embodiment, the time data is not transmitted in ASCII code because DTMF signals themselves can be used to directly represent the desired decimal digit of the time. In this way, only one DTMF signal is needed for each digit of the time. If the received DTMF signal is not a decimal digit, then receiver unit 120 performs the error routine.

If the received DTMF signal corresponds to a decimal digit, then receiver unit 120 stores the decimal digit in a temporary buffer in a step 1105. In a next step 1107, receiver unit 120 increments the counter. Receiver unit 120 then determines whether the count from the counter is equal to 4, in a next step 1109. The central office uses four digits to represent the time. If the count is less than 4, then in a step 1111, receiver unit 120 returns to step 603 (FIG. 6) to receive a next DTMF signal.

However, if the count is equal to 4, then, in a step 1113, receiver unit 120 sets the state variable to "2". Then in a next step 1115, receiver unit 120 displays the time information using display 121 (FIG. 2). In other embodiments, receiver unit 120 may also store the time information in memory 123 (FIG. 2). Then receiver unit 120 performs step 1111 to receive a next DTMF signal.

Referring back to step 1101, if receiver unit 120 does detect a DTMF "C" signal, the "end of transmission" has occurred and, accordingly, receiver unit 120 performs a step 1117 to set the state variable to "0". Receiver unit 120 then performs steps 1115 and 1111, described above.

Figure 12:
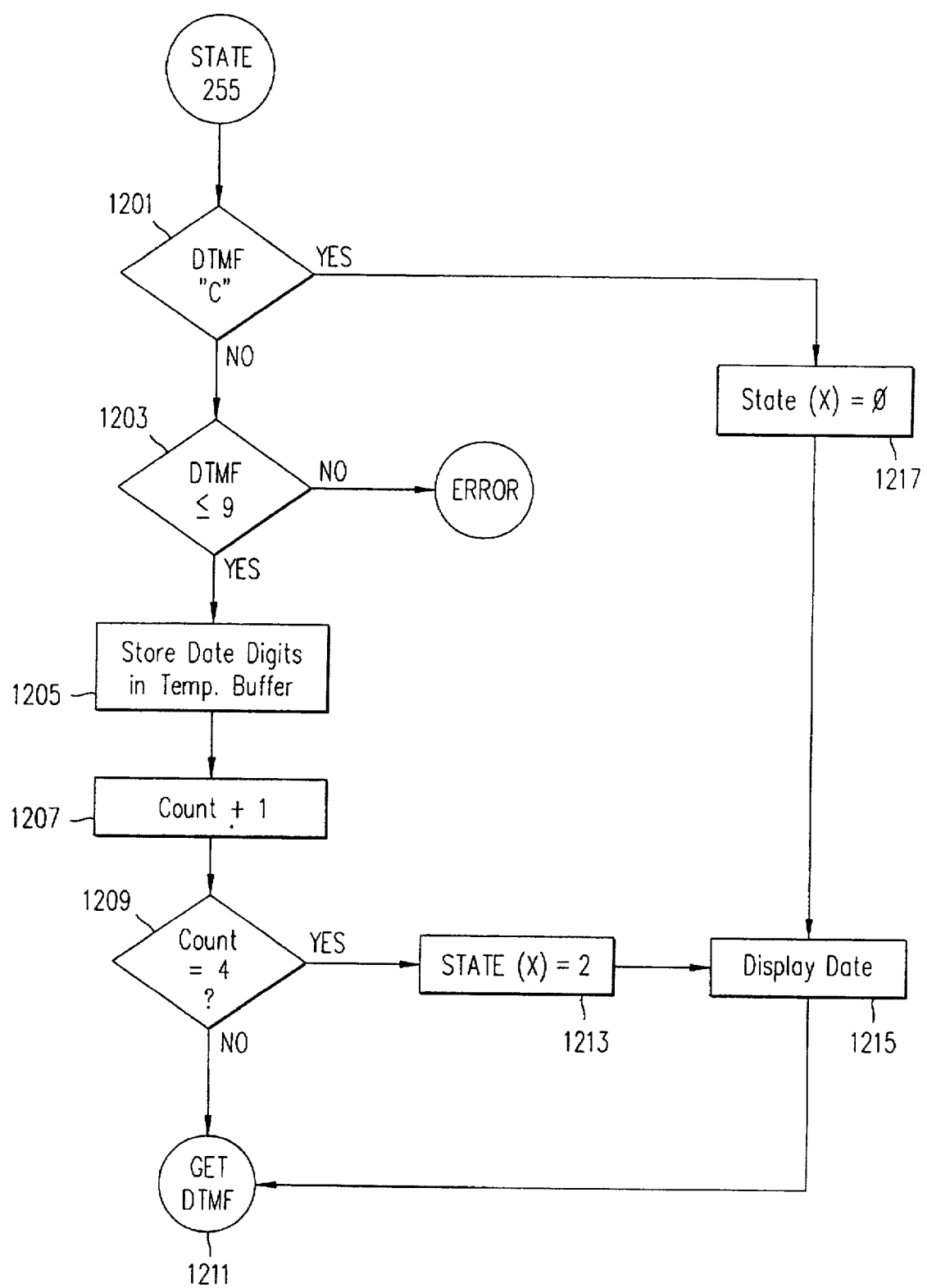

FIG. 12 shows the flow of operation of receiver unit 120 when in state "255". Receiver unit 120 enters state "255" after detecting a DTMF "1" signal in step 1009 (FIG. 10) described above. The steps of state "255" process the date data transmission from the central office.

In a step 1201, receiver unit 120 determines whether a DTMF "C" signal was received. If receiver unit 120 did not receive a DTMF "C" signal (i.e., the "end of transmission" signal), then receiver unit 120 performs a next step 1203. In step 1203, receiver unit 120 determines whether the received DTMF signal does not correspond to a decimal digit. The date data is not transmitted in ASCII code because DTMF signals themselves can be used to directly represent the desired decimal digit of the date. If the received DTMF signal is not a decimal digit, then receiver unit 120 performs the error routine.

If the received DTMF signal corresponds to a decimal digit, then, in a step 1205, receiver unit 120 stores the decimal digit in a temporary buffer. In a next step 1207, receiver unit 120 increments the counter. Receiver unit 120 then determines whether the count from the counter is equal to 4, in a next step 1209. The central office uses four digits to represent the date. Of course, the count can be easily increased to 6 (or more) in embodiments where the central office also transmits the year as part of the date information.

If the count is less than 4, then in a step 1211, receiver unit 120 returns to step 603 (FIG. 6) to receive a next DTMF signal. However, if the count is equal to 4, then, in a step 1213, receiver unit 120 sets the state variable to "2". In a next step 1215, receiver unit 120 displays the date information using display 121 (FIG. 2). In other embodiments, receiver unit 120 may also store the date information in memory 123 (FIG. 2). Then receiver unit 120 performs step 211 to receive a next DTMF signal.

Referring back to step 1201, if receiver unit 120 does detect a DTMF "C" signal, the "end of transmission" has occurred and, accordingly, receiver unit 120 performs a step 1217 to set the state variable to "0". Receiver unit 120 then performs steps 1215 and 1211, described above.

Figure 13:
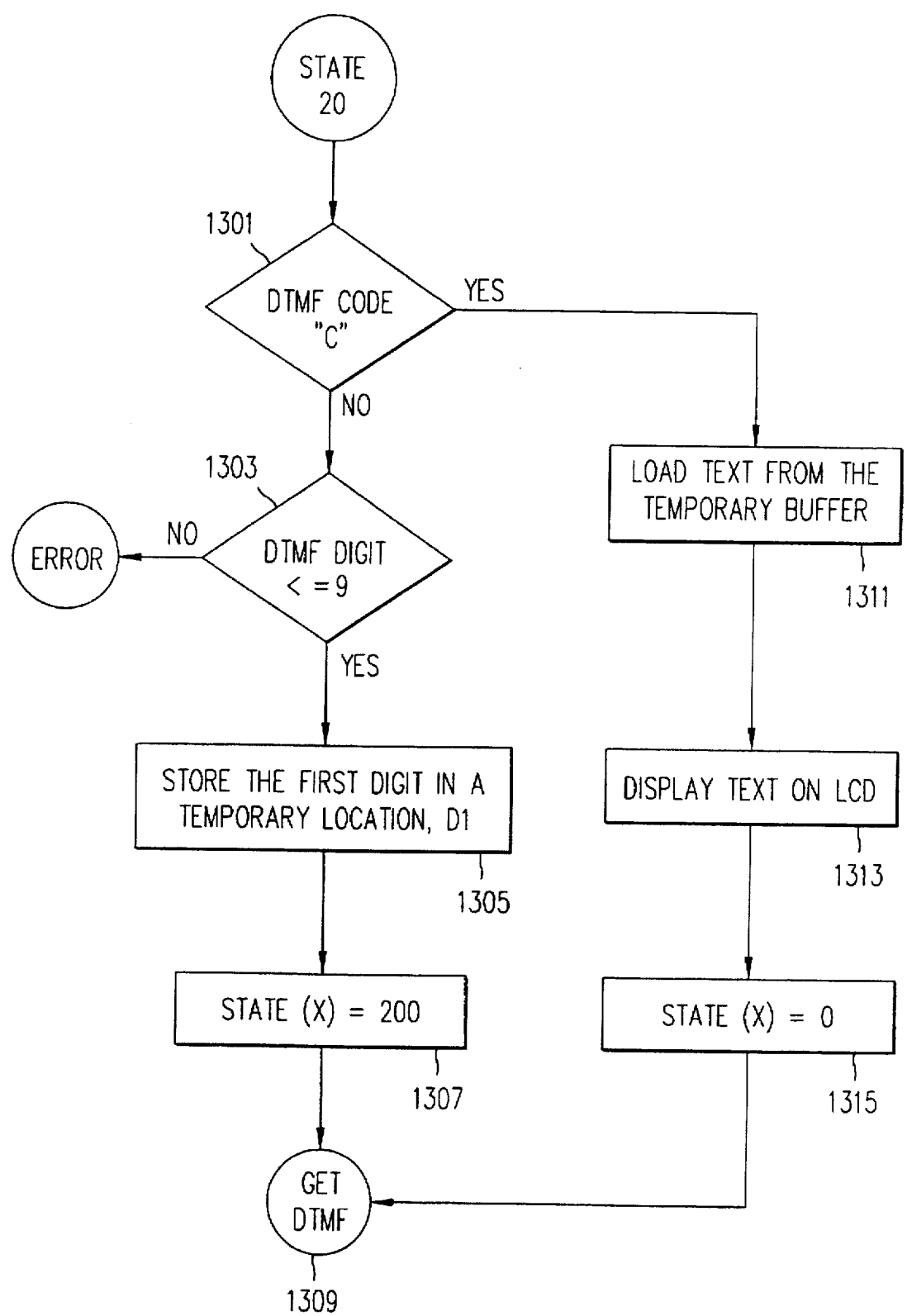

FIG. 13 shows the flow of operation of receiver unit 120 when in state "20". Receiver unit 120 enters state "20" when receiver unit 120 does not detect a DTMF "0" signal in step 901 (FIG. 9) described above. The steps of state "20" process the text data transmission from the central office. As stated above, in this embodiment, the central office sends each text character of the text data in the form of pairs of decimal digits according to the ASCII code.

In a step 1301, receiver unit 120 determines whether a DTMF "C" signal was received. If receiver unit 120 did not receive a DTMF "C" signal, then receiver unit 120 performs a next step 1303. In step 1303, receiver unit 120 determines whether the received DTMF signal corresponds to a decimal digit. If the received DTMF signal does not represent a decimal digit, then receiver unit 120 performs the error routine. However, if the received DTMF signal is a decimal digit, receiver unit performs a step 1305.

In step 1305, receiver unit 120 stores the DTMF decimal digit in a temporary data buffer. This decimal digit is the first decimal digit of the ASCII coded pair representing the text character. Then in a next step 1309, receiver unit 120 sets the state variable to "200". Receiver unit 120 then performs a next step 1309 to return to step 603 (FIG. 6) to receive the second decimal digit of the ASCII coded pair.

However, if in step 1301, receiver unit 120 did receive a DTMF "C" signal, then receiver unit 120 performs a step 1311. In step 1311, the text characters stored in the temporary buffer are loaded into controller 240 (FIG. 2). Then in a next step 1313, receiver unit 120 displays the text characters using display 121 (FIG. 2). In other embodiments, receiver unit 120 also stores the text characters in memory 123 (FIG. 2) for later retrieval. Receiver unit 120, in a next step 1315, sets the state variable to "0". Receiver unit 120 then performs step 1309 to return to step 603 and receive a next DTMF signal.

Figure 14:
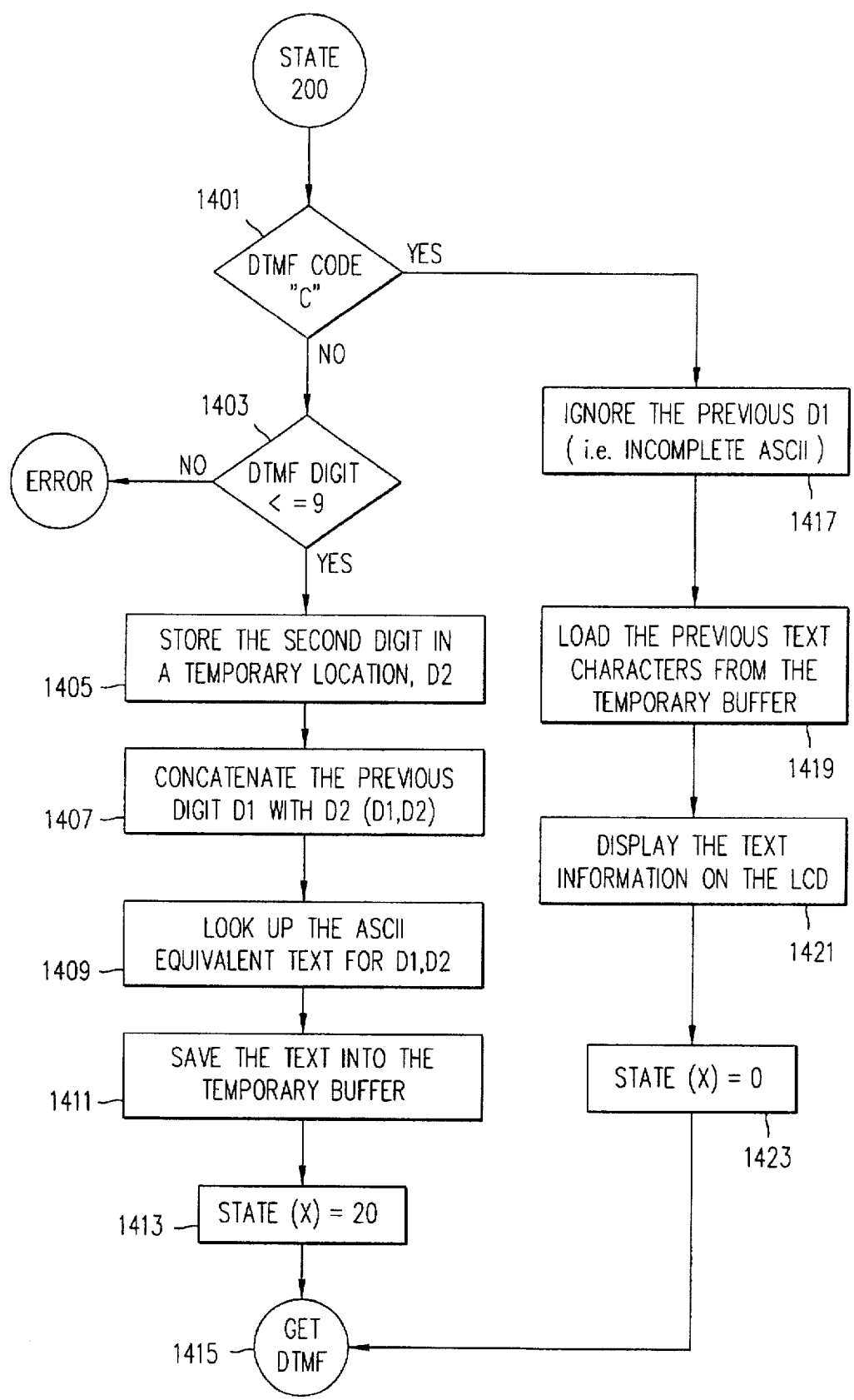

FIG. 14 shows the flow of operation of receiver unit 120 when in state "200". Receiver unit 120 enters state "200" after receiver unit 120 receives the first decimal digit of an ASCII coded pair representing a text character.

In a step 1401, receiver unit 120 determines whether a DTMF "C" signal was received. If receiver unit 120 did not receive a DTMF "C" signal, then receiver unit 120 performs a next step 1403. In step 1403, receiver unit 120 determines whether the received DTMF signal corresponds to a decimal digit. If the received DTMF signal does not represent a decimal digit, then receiver unit 120 performs the error routine. However, if the received DTMF signal is a decimal digit, receiver unit 120 performs a step 1405.

In step 1405, receiver unit 120 stores the DTMF decimal digit in a temporary data buffer. This decimal digit is the second decimal digit of the ASCII coded pair representing the text character. Then in a next step 1407, receiver unit 120 concatenates this second decimal digit of the text character with the first decimal digit of the text character stored in step 1305 (FIG. 13).

In a next step 1409, receiver unit 120 determines the text character represented by the two decimal digits. In this embodiment, controller 240 (FIG. 2) accesses a look-up table containing the ASCII code to determine the text character represented by the ASCII code. Receiver unit 120 then performs a next step 1309 to return to step 603 (FIG. 6) to receive the second decimal digit of the ASCII coded pair. Receiver unit 120, in next step 1411, stores the text character in the temporary buffer.

In a next step 1413, receiver unit 120 sets the state variable to "20", respectively. Then, in a next step 1415, receiver unit 120 returns to step 603 (FIG. 6) to receive a next DTMF signal.

Referring back to step 1401, if receiver unit 120 did receive a DTMF "C" signal, then receiver unit 120 performs a step 1417. In step 1417, invalidates the previous decimal digit because a second decimal digit was not received to complete the ASCII code for a text character.

In a next step 1419, receiver unit 120 loads the text characters stored in the temporary buffer into controller 240 (FIG. 2). Then in a next step 1421, receiver unit 120 displays the text characters using display 121 (FIG. 2). In other embodiments, receiving unit 120 also stores the text characters in memory 123 (FIG. 2) for later retrieval. Receiver unit 120, in a next step 1423, sets the state variable to "0". Receiver unit 120 then performs step 1415 to return to step 603 and receive a next DTMF signal.

FIG. 15 shows a flow diagram of the error routine used by receiver unit 120. In a step 1501, receiver unit sets the state variable to "0". Then in a next step 1503, receiver unit 120 performs the EXIT operation, whereby receiver unit 120 returns to step 609 (FIG. 6) eventually to turn off the DTMF receiver and return to step 501 (FIG. 5).

The foregoing has described the principles and preferred embodiments of the present invention. However, the invention should not be construed as being limited to the particular embodiments described. For example, different devices may be used instead of the controller, DTMF receiver, interface circuit devices described herein. Also, instead of a LCD display, different devices may be used to present the CID information to the user(s), including computers, audio systems or other signalling devices. Further, some functions can be combined in a custom digital processing chip. Thus, the above-described embodiments should be regarded as illustrative rather than restrictive. Variations can be made to those embodiments by workers skilled in the art without departing from the scope of the present invention as defined by the following claims.

I claim:

1. A method comprising the steps of:
   transmitting from a switching unit a first signal, said first signal being selected from the group consisting of a first ring signal and a voltage polarity reversal signal;
   receiving said first signal at a receiver unit;
   transmitting from said switching unit a start multifrequency signal, said start multifrequency signal being indicative of a start of a text transmission;
   receiving said start multifrequency signal at said receiver unit;
   transmitting a second multifrequency signal from said switching unit;

receiving said second multifrequency signal at said receiver unit;

transmitting a third multifrequency signal from said switching unit;

receiving said third multifrequency signal at said receiver unit, wherein said second and third multifrequency signals contain information indicative of a text character;

transmitting an end multifrequency signal from said switching unit, said end multifrequency signal being indicative of an end of said text transmission;

receiving said end multifrequency signal at said receiver unit; and then transmitting from said switching unit a second signal, said second signal being a ring signal; and receiving said second signal at said receiver unit.

2. The method of claim 1 further comprising the step of displaying said text character.

3. The method of claim 2 wherein said switching unit is a central office of a telephone system and said receiver unit is a customer premise equipment.

4. The method of claim 3 wherein said step of transmitting said start multifrequency signal comprises the step of transmitting said start multifrequency signal over a telephone line coupled between said central office and said customer premised equipment.

5. The method of claim 4 wherein said steps of transmitting said start, second, third and end multifrequency signals each comprise the step of transmitting a DTMF signal.

6. The method of claim 5 wherein said start multifrequency signal indicates DTMF symbol "A".

7. The method of claim 6 wherein said second and third multifrequency signals indicate DTMF numeric symbols corresponding to a two digit ASCII code for a text character.

8. A system comprising:

a switching unit capable of providing a first signal and a second signal, said first signal being selected from the group consisting of a first ring signal and a voltage polarity reversal signal, said second signal being a ring signal, said switching unit including a signal generator capable of providing a start multifrequency signal after said first signal is provided, at least a second multifrequency signal and a third multifrequency signal, and an end multifrequency signal before said second signal is provided; and a receiver unit capable of receiving said first signal, said start multifrequency signal, said at least said second and third multifrequency signals, said end multifrequency signal and said second signal, wherein:

said start multifrequency signal is indicative of a start of a text transmission;

said at least said second and third multifrequency signals contain information indicative of at least one text character; and said end multifrequency signal is indicative of an end of said text transmission.

9. The system of claim 8 further comprising a display, said display displaying said at least one text character.

10. The system of claim 9 wherein said switching unit is a central office of a telephone system and said receiver unit is a customer premise equipment.

11. The system of claim 10 further comprising a telephone line coupled between said central office and said customer premised equipment.

12. The system of claim 11 wherein said signal generator comprises a DTMF signal generator.

13. The system of claim 12 wherein said start multifrequency signal indicates DTMF symbol "A".

14. The system of claim 13 wherein said second and third multifrequency signals indicate DTMF numeric symbols corresponding to a two digit ASCII code for a text character.

15. The system of claim 9 further comprising a memory, said memory storing said at least one text character.

16. A device for receiving DTMF signals containing text data transmitted by a switching unit over a transmission channel, comprising:

a transmission channel interface coupled to said transmission channel;

a DTMF receiver coupled to said transmission channel interface, said DTMF receiver being capable of receiving said DTMF signals; and a controller coupled to said DTMF receiver, said controller being capable of decoding received DTMF signals into text data;

wherein said DTMF receiver includes:

structure for receiving a start signal after transmission of a first signal from said switching unit and prior to receipt of said DTMF signals containing said text data, said first signal being selected from the group consisting of a first ring signal and a voltage polarity reversal signal; and structure for receiving an end signal following receipt of said DTMF signals containing said text data and prior to transmission of a second signal from said switching unit, said second signal being a ring signal.

17. The device of claim 16 wherein said transmission channel interface is adapted to interface with a telephone line.

18. The device of claim 17 further comprising a ring detect circuit coupled to said telephone line and said controller.

19. The device of claim 17 further comprising a polarity detector coupled to said telephone line and said controller.

20. The device of claim 17 further comprising a display, said display adapted to display said text data.

21. The device of claim 17 further comprising a memory, said memory adapted to store said text data.

22. The device of claim 17 wherein said controller is adapted to decode a pair of DTMF signals representing a text character.

23. The device of claim 22 wherein each DTMF signal of said pair of DTMF signals represents a decimal digit whereby said pair of DTMF signals corresponds to an ASCII code of said text character.

24. A method comprising the steps of:

transmitting from a switching unit a first signal, said first signal being selected from the group consisting of a first ring signal and a voltage polarity reversal signal;

receiving said first signal at a receiving unit;

transmitting from said switching unit a start multifrequency signal, said start multifrequency signal being indicative of a start of a text transmission;

receiving said start multifrequency signal at said receiver unit;

transmitting a first selected number of multifrequency signals from said switching unit in sequence;

receiving said first selected number of multifrequency signals at said receiver unit, wherein said first selected number of multifrequency signals contain information indicative of a second selected number of text characters;

transmitting an end multifrequency signal from said switching unit, said end multifrequency signal being indicative of an end of said text transmission;

receiving said end multifrequency signal at said receiver unit; and then transmitting from said switching unit a second signal, said second signal being a ring signal; and receiving said second signal at said receiver unit.

25. The method of claim 24 wherein said second selected number is one half said first selected number.

26. The method of claim 1 wherein said first signal, said start, second, third and end multifrequency signals and said second signal are transmitted from said switching unit without any signal transmissions from said receiver unit.

27. The method of claim 24 wherein said first signal, said start multifrequency signal, said first selected number of multifrequency signals, said end multifrequency signal and said second signal are transmitted from said switching unit without any signal transmissions from said receiver unit.

* * * * *